Figure 1:
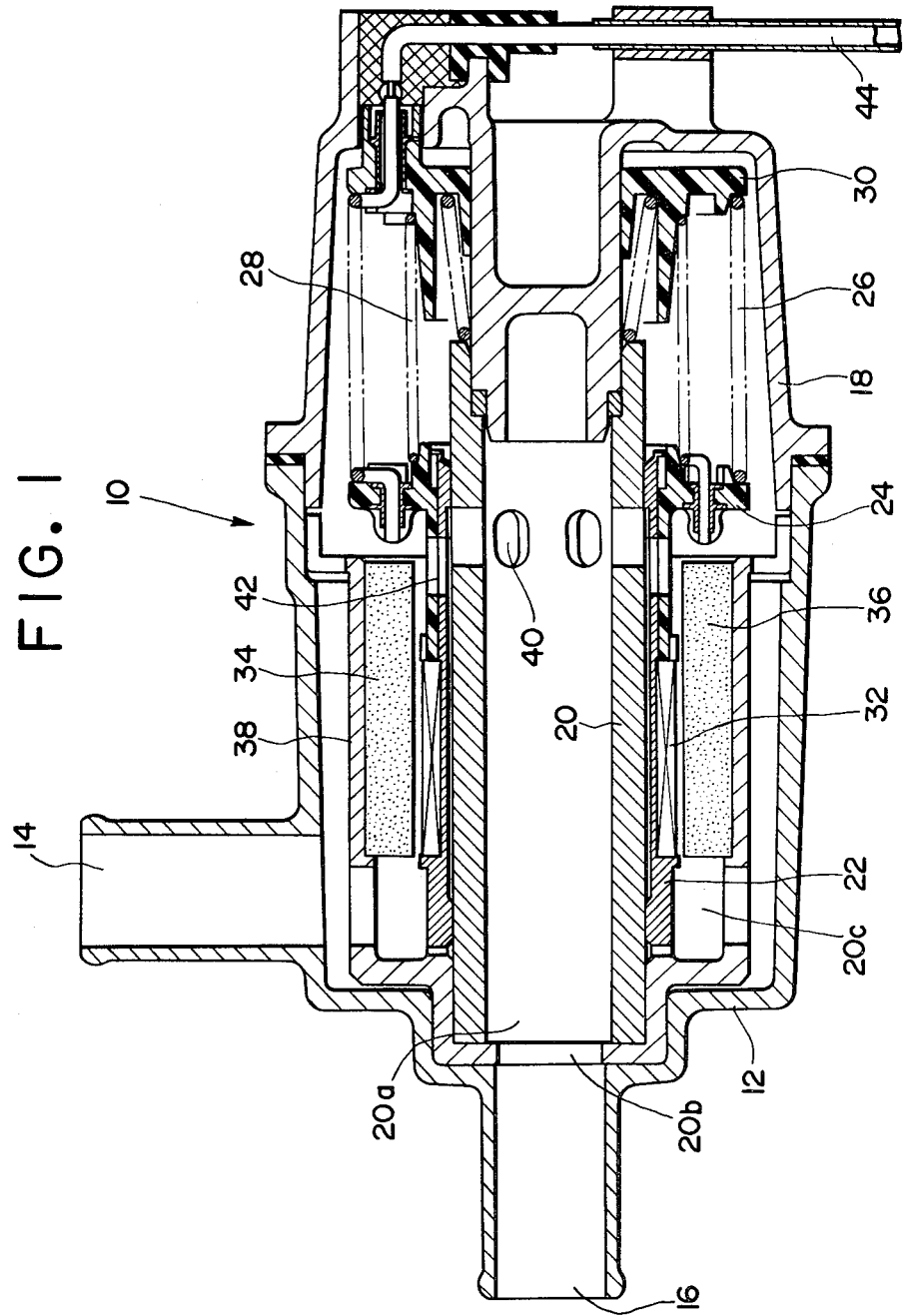

United States Patent [19]

Nomura et al.

[11] 4,437,645

[45] Mar. 20, 1984

[54] ELECTRICALLY DRIVEN FLOW CONTROL VALVE ASSEMBLY

[75] Inventors: Isshi Nomura, Aichi; Motonobu Akagi, Kariya, both of Japan

[73] Assignee: Aisin Seiki Kabushiki Kaisha, Kariya, Japan

[21] Appl. No.: 349,976

[22] Filed: Feb. 18, 1982

[30] Foreign Application Priority Data

Feb. 20, 1981 [JP] Japan .................................. 56-24769
Feb. 20, 1981 [JP] Japan .................................. 56-24770

[51] Int. Cl.³ ............................................. F16K 31/08
[52] U.S. Cl. ..................................... 251/65; 251/139
[58] Field of Search .................................. 251/65, 139

[56] References Cited

U.S. PATENT DOCUMENTS

| | | | |
|---|---|---|---|
| 2,637,343 | 5/1953 | Matthews | 251/65 |
| 3,001,549 | 9/1961 | Nelson et al. | 251/139 |
| 4,216,938 | 8/1980 | Inada et al. | 251/65 |
| 4,242,116 | 12/1980 | Aschberger et al. | 251/139 |
| 4,286,767 | 9/1981 | Hashimoto | 251/65 |
| 4,294,286 | 10/1981 | Ohumi | 251/65 |

*Primary Examiner*—Ronald C. Capossela
*Attorney, Agent, or Firm*—Finnegan, Henderson, Farabow, Garrett and Dunner

[57] ABSTRACT

A control valve assembly of the type in which a slide valve is driven along a hollow iron core by a linear motor to control the degree of communication between an inlet port and outlet port through the hollow interior of the iron core. A valve hole is provided in the slide valve so as to overlap a communicating hole formed in the iron core. When the linear motor is in the de-energized state the slide valve is retained by springs at a position that permits the valve hole to overlap the communicating hole to a predetermined extent. The linear motor upon being energized drives the slide valve against the springs so that the valve hole increases the opening degree of the communicating hole with an increase in the energizing current. Instead of providing the valve hole in the slide valve, a larger, second communicating hole may be formed in the iron core, this second hole being fully closed and the other communicating hole fully opened by the slide valve when the linear motor is de-energized. With energization, the fully open communicating hole is gradually closed and the second communicating hole gradually opened with an increase in the current as the slide valve is driven along the iron core against the springs. Thus the inlet and outlet ports are neither fully closed nor fully open to each other when the linear motor is in the de-energized state.

2 Claims, 2 Drawing Figures

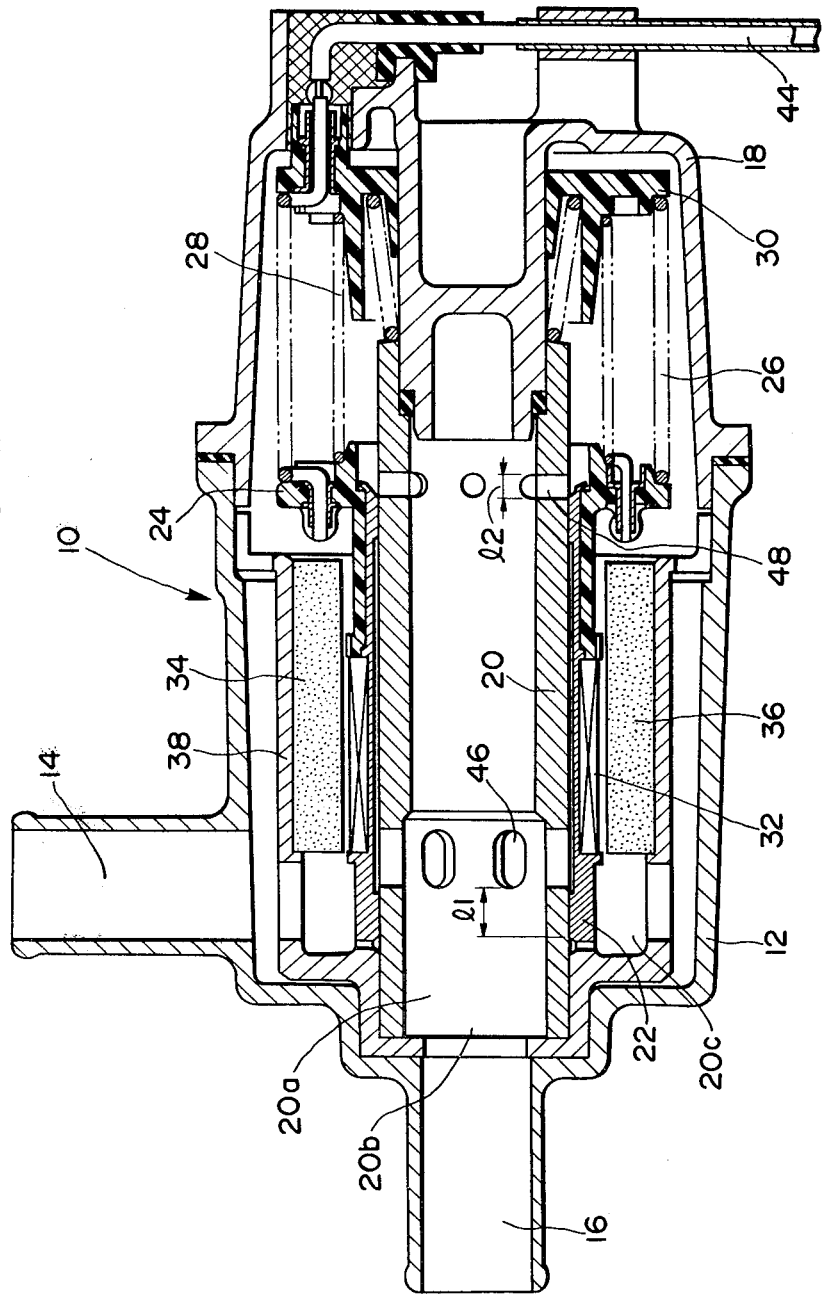

ELECTRICALLY DRIVEN FLOW CONTROL VALVE ASSEMBLY

This invention relates to an electrically driven flow control valve assembly for regulating the flow of a fluid such as air between an inlet and an outlet by controlling the effective opening degree of the communicating passage via a slide valve driven by an electromagnetically actuated linear motor. More particularly, the invention relates to a valve assembly of the type described in which the fluid flow is controlled in proportion to an electric current.

An electrically driven flow control valve assembly of the aforementioned type includes a moving-coil linear motor comprising a hollow iron core, a slide valve slidably disposed on the core, permanent magnets so arranged that the magnetic flux produced thereby passes through an electromagnetic coil at a right angle, the coil being wound on a bobbin which is formed on the slide valve, and a yoke or body of a ferromagnetic substance for forming, together with the hollow iron core, a magnetic circuit for the permanent magnets. The hollow core has a hole formed in the wall thereof for communicating the inlet and outlet of the valve assembly through the hollow interior of the core, the effective opening degree of the communicating hole being controlled by the slide valve. The assembly further includes springs for biasing the slide valve in the direction that either (a) fully closes or (b) fully opens the communicating hole. When the valve assembly in which the valve is biased closed is disposed in an intake passage that by-passes the intake line of a throttle valve in order to control the idling speed of an engine, a problem may develop in a case where the engine is stopped following the intake of high-temperature humid air and then left to stand in a cold environment at a temperature of, say, −20° to −30° C. Specifically, when the engine is left standing under such conditions, ice develops on the sliding surface of the slide valve which is held in the fully closed position owing to the biasing force applied by the springs. Consequently, when the ignition switch is turned on again in an effort to start the cold engine, the communicating hole in the hollow core is closed completely by the slide valve which is frozen in place, preventing the intake of the prescribed amount of air. The engine will therefore fail to start. On the other hand, when the abovementioned valve assembly in which the valve is biased open is installed in said intake passage, a problem will occur should a wire break in the electrical circuitry of the valve assembly during engine idling. Specifically, should such breakage occur, the flow of current that actuates the linear motor will be interrupted and the slide valve will be urged toward and maintained at the fully open position by the springs. This causes the delivery of a very large quantity of air that suddenly raises the speed of the engine to an extent unsuitable for idling.

Accordingly, an object of the present invention is to provide an electrically driven flow control valve assembly so adapted as to deliver enough air to start an engine even if the slide valve should be frozen in place owing to exposure to a very cold environment, and yet which prevents the supply of an excessively large quantity of air to the engine during idling even if an electric current for driving the slide valve should be interrupted during such idling.

To achieve the foregoing object, the present invention provides, in one aspect thereof, an electrically driven flow control valve assembly in which the slide valve includes a valve hole for controlling the opening degree of the communicating hole formed in the hollow iron core. The arrangement is such that the valve hole always overlaps the communicating hole to a predetermined extent even when the electromagnetic coil for driving the slide valve is in the de-energized state, the degree of overlap increasing and then decreasing as the slide valve is driven along the iron core with an increase in energizing current.

In another aspect of the present invention, the hollow iron core is provided with first and second communicating holes the effective opening degree thereof is controlled by the slide valve as it slides along the iron core. The arrangement is such that the first communicating hole is fully closed and the second communicating hole fully opened by the slide valve when the electromagnetic coil is in the de-energized state. With the application of an energizing current, the effective opening degree of the first communicating hole is increased and the effective opening degree of the second communicating hole decreased by the slide valve as it slides along the iron core with an increase in the energizing current.

In both aspects of the present invention de-energization of the electromagnetic coil establishes neither the fully closed nor fully open state, so a predetermined supply of air is always available for starting the engine, without the possibility of an excess amount of air being supplied during engine idling.

These and other objects and features of the present invention will be apparent from the following description taken in conjunction with the following drawings, in which like reference characters designate the same or similar parts throughout the figures thereof.

FIG. 1 is a longitudinal sectional view of a first embodiment of an electrically driven flow control valve assembly according to the present invention, and FIG. 2 is a longitudinal sectional view of a second embodiment of an electrically driven flow control valve assembly according to the present invention.

Referring to FIG. 1, a first embodiment of an electrically driven flow control valve assembly constructed in accordance with the present invention is shown generally at numeral 10. The valve assembly includes a body 12 having an inlet port 14 and an outlet port 16 forming an intake passage which by-passes the intake line of a throttle valve, which is not shown. A cover 18 is airtightly joined to the body 12 at the right-hand end thereof to form a unitary structure with the body. A hollow iron core 20 made of a ferromagnetic substance is so disposed within the body 12 as to lie coaxial therewith. The hollow core 20 has a hollow interior 20a and is opened at its left-hand end that faces the outlet port 16. A space 20c is delimited outside the core 20. The valve assembly further includes a bobbin-type slide valve 22, consisting of a non-magnetic substance, slidably disposed on the iron core 20 and fixedly secured to a bobbin holder 24. The bobbin holder 24, comprising a non-conductive member, is biased to the left in FIG. 1 by means of springs 26, 28 disposed between the right-hand end of the iron core 20 and a stationary, non-conductive holder 30 which is affixed to the cover 18. Thus the slide valve 22, slidable along the outside of the hollow core 20 and rigidly connected to the bobbin holder 24, is biased to the left of FIG. 1 and retained at a predetermined position by the springs 26, 28 acting directly upon the bobbin holder. An electromagnetic coil 32 is wound on the slide valve 22 through the intermediary of the bobbin holder 24, and a pair of permanent magnets 34, 36 are provided within the valve assembly and arranged in such a manner that the magnetic flux produced thereby passes through the windings of the electromagnetic coil 32 at a right angle. A ferromagnetic yoke 38 cooperates with the core 20 to form a magnetic circuit for the flux produced by the permanent magnets 34, 36. The iron core 20, the slide valve 22 having the electromagnetic coil 32, the permanent magnets 34, 36 and the yoke 38 construct a moving-coil linear motor, as is well known.

The iron core 20 has a plurality of axially elongated communicating holes 40 formed in its wall for communicating the hollow interior 20a of the iron core with the space 20c delimited outside. A plurality of oblong valve holes 42 corresponding to the communicating holes 40, and which may be somewhat shorter than the communicating holes, are formed penetrating through the slide valve 22 and the bobbin holder 24 secured thereto, the valve holes overlapping the communicating holes 40. Thus the valve holes 42 are capable of sliding axially relative to the iron core 20 as the slide valve 22 slides therealong to control the opening degree of the communicating holes 40, as will be described in greater detail below. When current is cut off from the electromagnetic coil 32, the right- and left-hand edges of the valve hole 42 will be situated to the left of the right- and left-hand edges, respectively, of the communicating holes 40, owing to the action of the springs 26, 28 which retain the slide valve 20 at the predetermined position on the left-hand side of the valve assembly. Thus the communicating holes 40 are never fully closed, even with the coil 32 is in the de-energized state. The hollow interior 20a of the core 20 communicates with the outlet port 16 through the open end 20b of the core, and the space 20c outside the core communicates with the inlet port 14. Therefore, since the valve holes 42 overlap the communicating holes 40, the inlet port 14 and outlet port 16 are communicated through the space 20c, valve holes 42, communicating holes 40, and the hollow interior 20a of the iron core 20 via the open end 20b thereof. The inlet port 14, it should be noted, communicates with a source of atmospheric air (not shown), while the outlet port 16 communicates with a source of negative pressure (not shown).

The electromagnetic coil 32 has its two ends electrically connected to respective ones of the springs 26, 28 secured at one end to the bobbin holder 24. The springs 26, 28 are in turn electrically connected to a pair of leads 44 which are connected to a driving circuit, not shown, for supplying the electromagnetic coil 22 with electric power via the springs 26, 28. When the electromagnetic coil 32 is in the de-energized state, the slide valve 22 is retained at the left hand side of the assembly by the springs 26, 28, as mentioned above. When an energizing current is applied to the electromagnetic coil 32 through the springs 26, 28, the slide valve 22 is driven slidably to the right along the iron core 20 against the force of the springs 26, 28 owing to the energization of the electromagnetic coil 32, and therefore is displaced by a distance commensurate with the magnitude of the current flowing into the coil. As the slide valve 22 is displaced, the effective opening degree of the communicating holes 40 is controlled by the overlapping valve holes 42 formed in the slide valve 22. This in effect controls the degree of communication between the inlet port 14 and outlet port 16, thereby regulating the amount of atmospheric air that flows into the source of negative pressure.

According to the construction of the present invention, the communicating holes 40 will never be fully closed by the slide valve 22, even when the electromagnetic coil 32 is de-energized, owing to the positional relationship between the communicating holes 40 and the valve holes 42. Thus the quantity of air initially delivered to the outlet port 16 will always conform to the predetermined effective opening degree of the communicating holes 40 that prevails when the coil 32 is in the de-energized state. When an energizing current is delivered to the electromagnetic coil 32, the slide valve 22 will be driven to the right in FIG. 1 by a distance commensurate with the magnitude of the applied current, the effective opening degree of the communicating holes 40 being increased as the valve holes 42 also move to the right to overlap the holes 40 to a greater extent. Thus the quantity of atmospheric air delivered from the inlet port 14 to the outlet port 16 is increased from the predetermined initial quantity proportionally with respect to the applied energizing current. As said current is increased further, the degree of overlapping between the valve holes 42 and the communicating holes 40 increases until a perfectly overlapping state is achieved, thereby establishing the maximum effective opening degree, i.e., the fully open state. This permits a substantially constant flow of the maximum quantity of atmospheric air. With a further increase in current, the effective opening degree of the communicating holes 40 is diminished as the slide valve 22 moves further to the right to reduce the degree of overlap between the holes 40, 42. This reduces the flow of atmospheric air from the maximum value achieved at the time of perfect overlap, the air flow decreasing in proportion to the increase in current.

Thus, unlike the conventional valve assembly, the valve assembly of this invention does not have the communicating holes 40 placed in the fully open state in the absence of a current flow. Consequently, the engine will not experience a sudden increase in speed even if the current flowing into the electromagnetic coil 32 should be interrupted during engine idling. In addition, since the communicating holes 40 are never fully closed, even with the electromagnetic coil de-energized, the engine will always be supplied with the necessary amount of air even if the sliding surface of the slide valve should be frozen in place by leaving the engine standing at an external temperature of from $-20°$ to $-30°$ C. following the stopping of the engine.

Reference will now be had to FIG. 2 for a description of the second embodiment of the present invention. Unlike the arrangement of FIG. 1, the valve holes 42 are omitted and, instead of the communicating holes 40, a plurality of oblong first communicating holes 46 and a plurality of second communicating holes 48 are formed in the wall of the hollow core 20. More specifically, the second communicating holes 48, of a size for delivering a small flow of air sufficient for starting the engine, are formed in the core wall to cover an axially extending distance l2 measured to the right from the right-hand edge of the slide valve 22. The oblong first communicating holes 46, on the other hand, are formed in the core wall to cover an axially extending distance l2 (l1≧l2) measured to the right from the left-hand edge of the slide valve 19. As with the communicating holes 40 of the first embodiment, the first and second communicating holes 46, 48 of this embodiment communicate the hollow interior 20a of the iron core 20 with the surrounding space 20c, and have their opening degree controlled by the slidably disposed slide valve 22. As the slide valve is slidably displaced along the iron core against the force of the springs 26, 28 by energizing the electromagnetic coil 32, the effective opening degree of the communicating holes 46, 48 is controlled by the slide valve to regulate the degree of communication between the inlet and outlet ports 14, 16 and, hence, the amount of atmospheric air which flows into the the negative pressure source.

According to the construction of this embodiment of the present invention, the first communicating holes 46 are fully closed, and the second communicating holes 48 fully opened, by the slide valve 22 when the electromagnetic coil 32 is in the de-energized state, the slide valve being retained on the left-hand side of the assembly by the springs 26, 28. Consequently, owing to the predetermined size of the fully open second communicating holes 48, the initial inflow of air delivered to the outlet port 16 will always be enough to start the engine, which air flow will correspond to the size of the holes 48. When the electromagnetic coil 32 is energized, the slide valve 22 is displaced to the right against the force of the springs 26, 28. Owing to the positional relationship and dimensions of the first and second communicating holes 46, 48, the holes 46 remain fully closed by the slide valve 22, whereas the holes 48 have their opening degree decreased to proportionally diminish the air flow from the initial amount. As the energizing current is increased and the slide valve 22 moved rightward a distance exceeding l2, both the first and second communicating holes 46, 48 are closed completely to interrupt the inflow of air. As the current is increased further to displace the slide valve 22 a distance exceeding l1, the second communicating holes 48 remain fully closed, whereas the first communicating holes 46 have their opening area enlarged to proportionally increase the air flow. Regulating the amount of air delivered by the first communicating holes 46 enables idling speed to be controlled in the same fashion as practiced in the prior-art arrangement.

Thus, as opposed to the prior art, the valve assembly having the construction of this embodiment never has its communicating holes completely closed by the slide valve 22 when the electromagnetic coil 32 is in the de-energized state. Accordingly, the prescribed amount of atmospheric air can always be supplied to the engine even if the slide valve should be frozed in place after the engine has been turned off. Thus it is possible to eliminate the starting difficulties encountered in the prior art merely by adding a separate set of communicating holes to the communicating holes already formed in the wall of the hollow iron core in the conventional arrangement.

According to the present invention as described and illustrated hereinabove, therefore, the inlet and outlet ports are never completely closed off from each other, nor are they ever opened fully to each other, when the electromagnetic coil is in the de-energized state. Therefore, in the event that the slide valve should freeze in place in a cold environment, air will be available to start the engine, the amount being decided by the particular arrangement and dimensions of the valve and/or communicating holes. Moreover, if the current applied to the electromagnetic coil should be cut off during engine idling, the slide valve will be biased in favor of the smaller, predetermined opening to avoid an excessive inflow of air that would abruptly raise the idling speed.

As many apparently widely different embodiments of the present invention can be made without departing from the spirit and scope thereof, it is to be understood that the invention is not limited to the specific embodiments thereof except as defined in the appended claims.

We claim:

1. An electrically driven flow control valve assembly with comprises:
   a body having an inlet port and an outlet port;
   a hollow iron core, disposed coaxially within said body, having at least one communicating hole for communicating said inlet and outlet ports through the interior of said iron core;
   a slide valve disposed on the outside of said iron core for sliding movement axially therealong, said slide valve having an electromagnetic coil wound thereon, and including at least one valve hole which overlaps said communicating hole to control the effective opening degree of said communicating hole as the slide valve slides for regulating the degree of communication between said inlet and outlet ports;
   a pair of permanent magnets so arranged that the magnetic flux produced thereby passes through the windings of said electromagnetic coil at a right angle;
   a ferromagnetic member for forming a magnetic circuit for the magnetic flux produced by said permanent magnets; and
   a pair of springs for biasing said slide valve and for delivering an energizing current to said electromagnetic coil;
   said slide valve being retained at a predetermined position by said springs when said electromagnetic coil is in the de-energized state, and being driven slidably along said iron core against the force of said springs in response to energization of said electromagnetic coil by the energizing current;
   said valve hole being so formed in said slide valve as to deliver a predetermined initial flow quantity through the effective opening of said communication hole when said slide valve is retained at said predetermined position with said electromagnetic coil in the de-energized state, and to temporarily increase and then decrease the flow quantity through the effective opening of said communication hole as said slide valve is driven slidably along said iron core with an increase in the energizing current following excitation of said electromagnetic coil.

2. An electrically driven flow control valve assembly which comprises:
   a body having an inlet port and an outlet port;
   a hollow iron core, disposed coaxially with said body, having at least one first communicating hole and at least one second communicating hole formed therein for communicating said inlet and outlet ports through the interior of said iron core;
   a slide valve disposed on the outside of said iron core for sliding movement axially therealong;
   a pair of permanent magnets so arranged that the magnetic flux produced thereby passes through the windings of said electromagnetic coil at a right angle;

a ferromagnetic member for forming a magnetic circuit for the magnetic flux produced by said permanent magnets; and a pair of springs for biasing said slide valve and for delivering and energizing current to said electromagnetic coil;

said slide valve being retained at a predetermined position by said springs when said electromagnetic coil is in the de-energized state, and being driven slidably along said iron core against the force of said springs in response to energization of said electromagnetic coil by the energizing current;

said first communicating hole being fully closed and said second communicating hole fully opened by said slide valve in order to deliver a predetermined initial flow quantity when said slide valve is retained at said predetermined position with the electromagnetic coil in the de-energized state, the effective opening degree of said first communicating hole being increased and the effective opening degree of said second communicating hole decreased by said slide valve as said slide valve is driven slidably along said iron core with an increase in the energizing current.

* * * * *

UNITED STATES PATENT AND TRADEMARK OFFICE
CERTIFICATE OF CORRECTION

PATENT NO. : 4,437,645
DATED : March 20, 1984
INVENTOR(S) : Isshi NOMURA & Motonobu AKAGI It is certified that error appears in the above—identified patent and that said Letters Patent is hereby corrected as shown below:

Column 6, line 10, change "with" to --which--.

Signed and Sealed this

Second Day of October 1984

[SEAL]

*Attest:*

*Attesting Officer*

GERALD J. MOSSINGHOFF

*Commissioner of Patents and Trademarks*